Jan. 23, 1968   R. H. GARTSIDE   3,364,723
AUTOMATIC TAG FEEDING MACHINE
Filed March 25, 1965   7 Sheets-Sheet 1

INVENTOR.
ROGER H. GARTSIDE
BY
CAROTHERS AND CAROTHERS
HIS ATTORNEYS

Jan. 23, 1968     R. H. GARTSIDE     3,364,723
AUTOMATIC TAG FEEDING MACHINE
Filed March 25, 1965     7 Sheets-Sheet 2

INVENTOR.
ROGER H. GARTSIDE
BY
CAROTHERS AND CAROTHERS
HIS ATTORNEYS

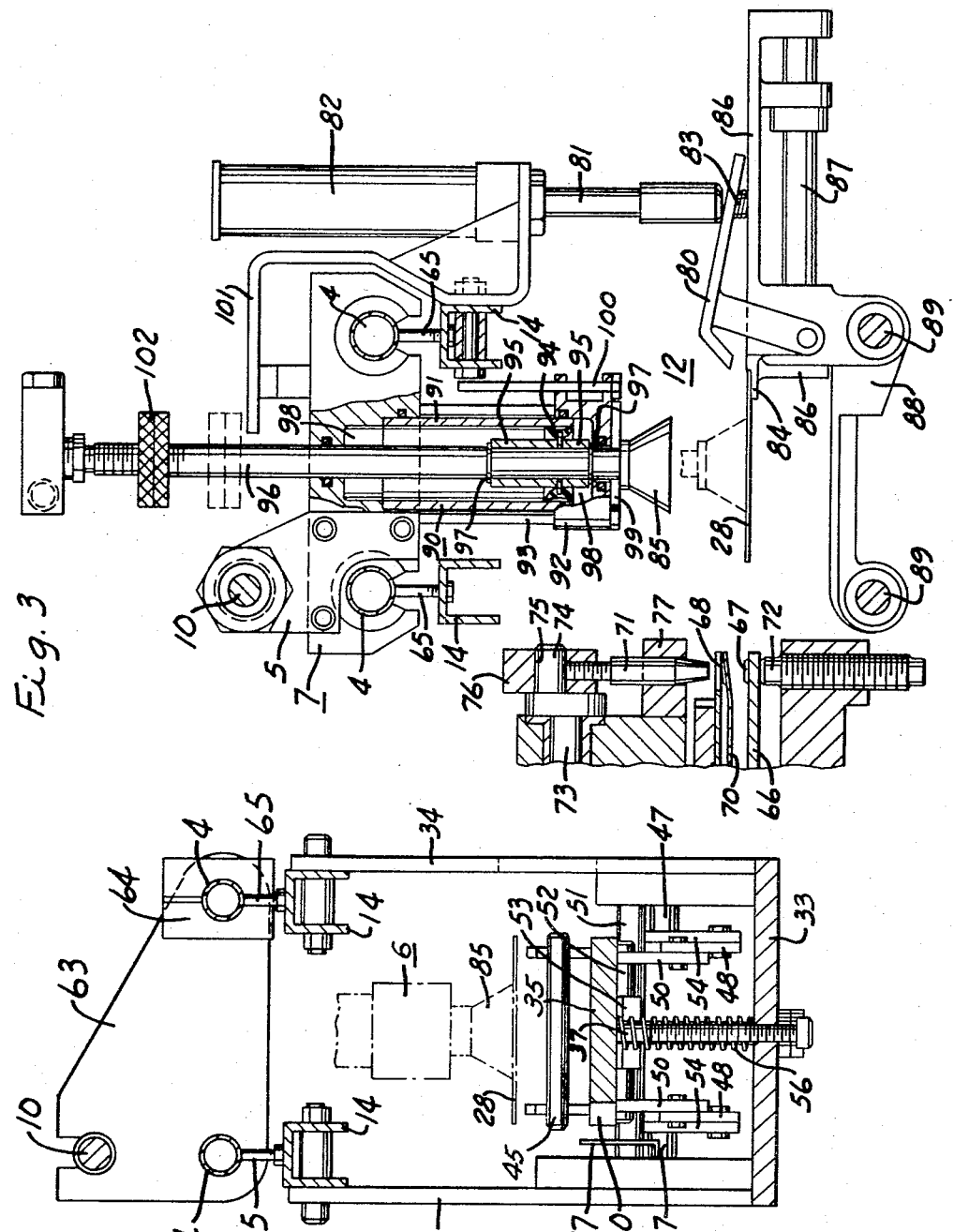

INVENTOR.
ROGER H. GARTSIDE
BY
CAROTHERS AND CAROTHERS
HIS ATTORNEYS

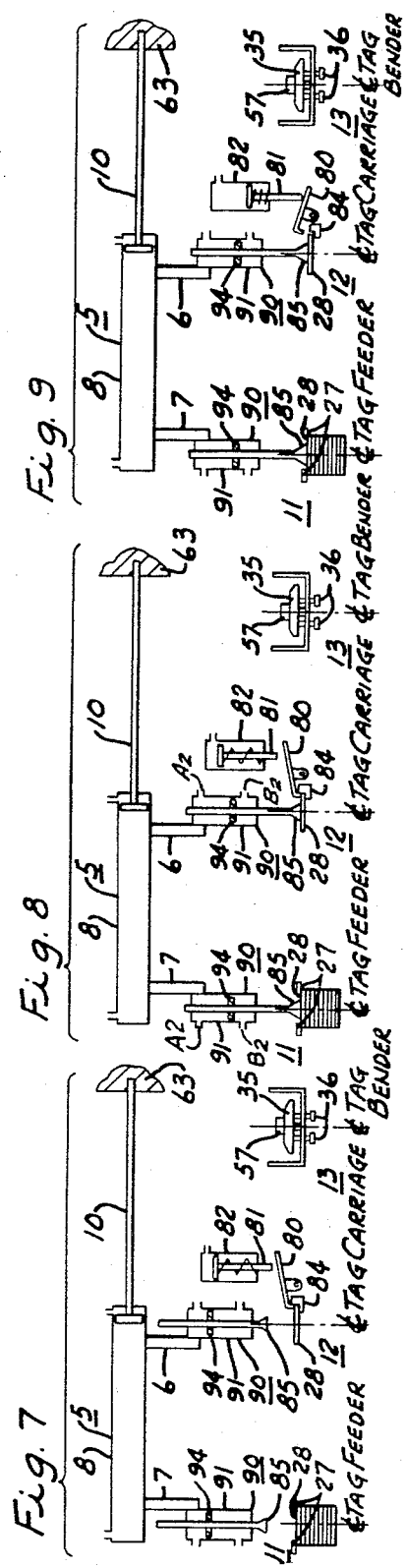

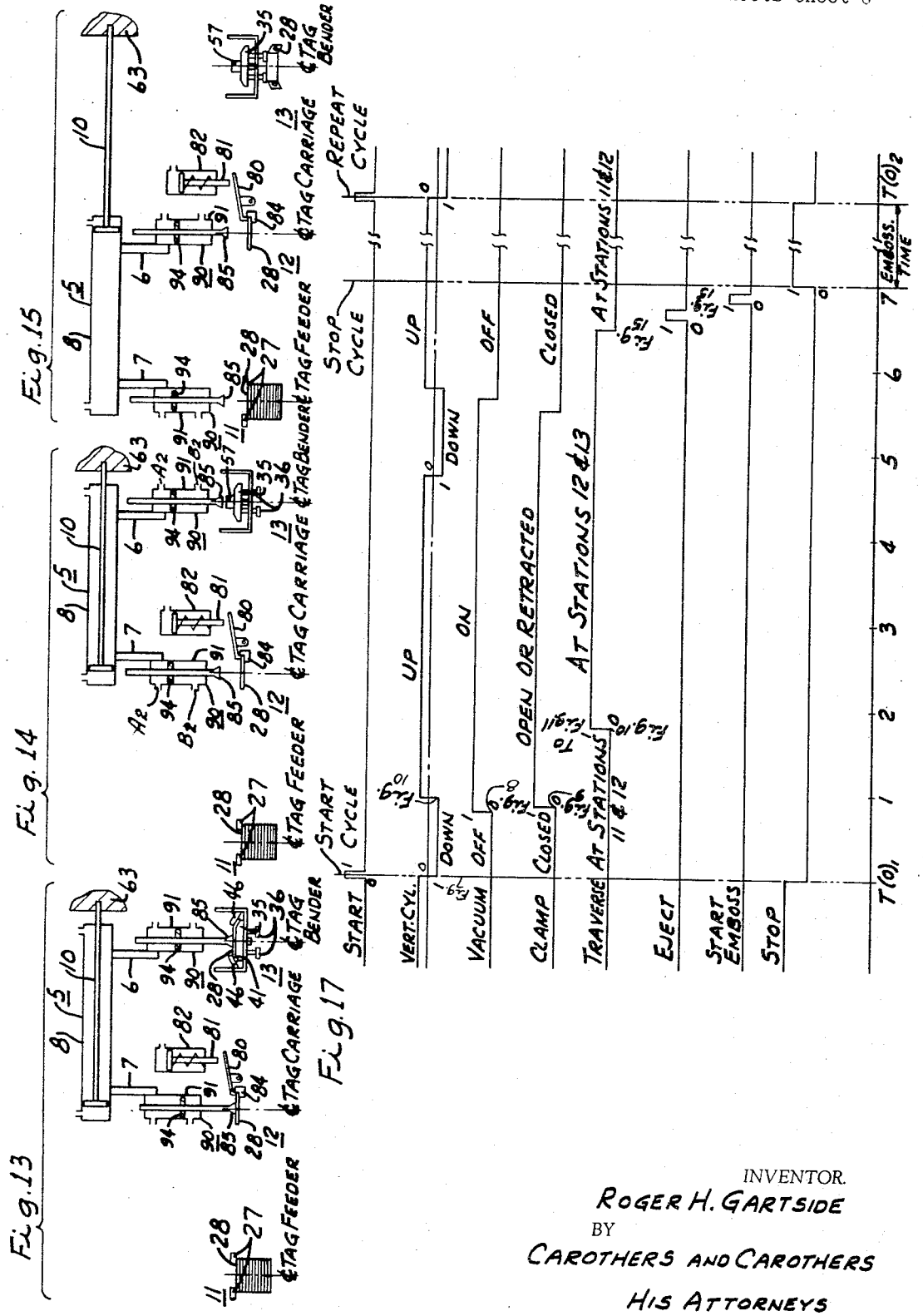

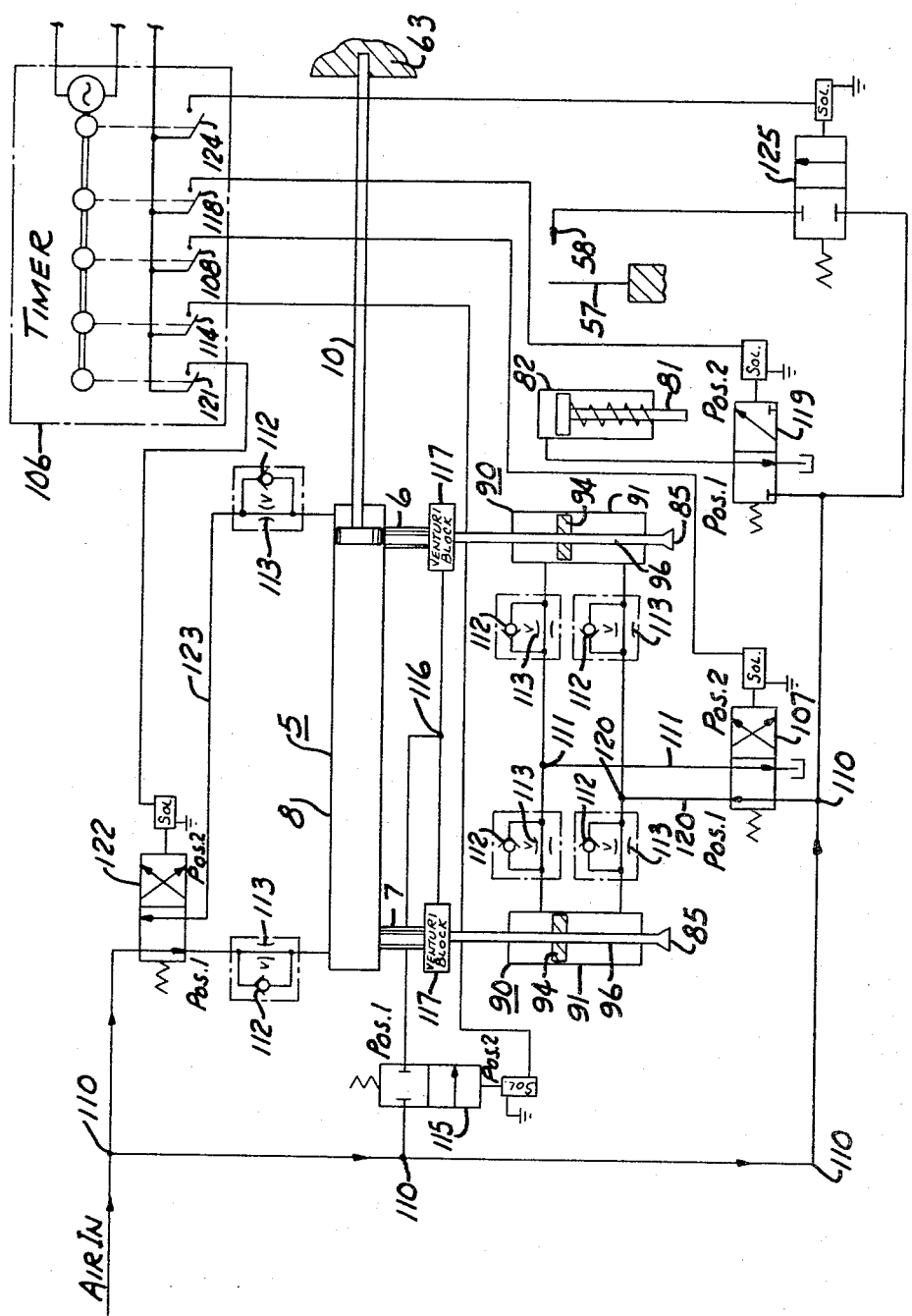

United States Patent Office 3,364,723
Patented Jan. 23, 1968

3,364,723
AUTOMATIC TAG FEEDING MACHINE
Roger H. Gartside, Shaler Township, Allegheny County, Pa., assignor to The Pannier Corporation, Pittsburgh, Pa., a corporation of Pennsylvania
Filed Mar. 25, 1965, Ser. No. 442,652
9 Claims. (Cl. 72—405)

ABSTRACT OF THE DISCLOSURE

In the art of marking tags with a computer controlled marker, it is necessary to quickly pick up one tag at a time and successively transfer them to a marking station where they are clamped against an aligning ledge for marking, thence to a tag forming station for shaping and lastly discharged. The tags are stacked in guides and biased upwardly against a tag holding means at its opposite edges permitting a suction cup to arch the center of the top tag and withdraw only one tag from the stack. Spaced vertically movable suction cups on a shiftable carriage raise the tags and move them to the next consecutive station. A clamp at the marking station pulls the tag against an aligning ledge and is shiftable to move the tag in any direction to mark the same after which the second suction cup spaced on the shiftable carriage lifts the marked tag from the clamp and transfers it to the tag forming station. A die carrying platform at the forming station has limited vertical movement and is pressure biased upwardly. A self-operating tag shaping means is actuated by the downward movement of the platform made by the vacuum cup pushing the tag and platform down. The shaping means is on one arm of a bell crank pivoted on a stationary part of the machine and its other arm pivoted through a link to an operating crank pivoted to the same stationary machine part and depressed by the downward movement of the platform. The movement of the operating crank is multiplied by the bell crank which swings inwardly from opposite sides to engage the tag and press it into the dies carried by the platform. A retainer on the underside of the platform reverses the movement of the operating crank to retract the bell crank shaping means as the platform pressure biasing means moves the platform upwardly. The bell cranks retracted leaves one side of the platform open. The other slide is notched to receive a vertically mounted reed when flexed by any suitable means such as an air jet. The flexure of the reed knocks the marked and formed tag from the side of the platform.

---

This invention relates generally to tag feeding machines and more particularly to an automatic machine to concurrently pick up two tags, a new tag and a marked tag, at two stations in a series of at least three stations and concurrently shift the tags to the next consecutive stations where they are deposited by positive action where the tags are clamped for marking at one station and formed at the other station and after forming discharged which completes the cycle when the machine is in readiness to repeat the cycle.

This machine contemplates a plurality of stations one for feeding the tags, one for marking the tags, one for forming the tags, and one for discharging the completed and formed tag. By novel means the last station may be combined with the forming station and thus eliminate one station which is an object of this invention.

Another object of this invention is the provision of an automatic tag feeding machine having means to engage the intermediate portion of the tag from a stack of tags and lift it upwardly against the retention at opposite sides thereof, to arch the tag and prevent the removal of more than one tag at a time.

Another object of this invention is the provision of a tag lifting means in the form of a pneumatic piston and cylinder with a suction cup on the lower end of the piston connected to a source of suction to lift the tag when engaged by the suction cup. Another important feature of this phase of the invention is the provision of a delicate flexible rim on the suction cup that will adapt itself to irregularities such as printing and embossing on the tag yet will support and convey the tag by conforming to these small irregularities.

Another object of this invention is the provision of a venturi form of suction device used in combination with the suction cup which immediately drops the tag or plate when the pressure applied to the venturi is shut off.

Another object of this invention is the provision of a spring biased clamp for engaging a tag on a ledge to suspend the same in the air and for engaging the edge of the tag on this ledge to retain it free for marking. Said spring biased clamp being manually or pneumatically actuated to open and release the tag automatically when the suction cup supports and lifts the same from the ledge.

Another object is the provision of a clamp which is pivoted so that its bighting edge engages the tag and moves it back toward the clamp and against an aligning shoulder at the back of the ledge. This spring biased clamp may be manually released but is automatically released by a pneumatic spring biased piston in a cylinder. Upon release of the air the spring moves the clamp with its bighting edge engaging the tag and forcing it back against a shoulder at the same time it is released by the suction cup. When the clamp is released the suction cup is there to pick up the tag at the same time.

Another object in this invention is the provision of a tag forming means including a spring platform having die shaped ends and when depressed downwardly by the vacuum cup of the tag transfer mechanism with a tag thereunder, the depression of the platform die actuates die operating cranks pivoted on the base which in turn swing tag shaping bell crank levers to impress the ends of the tag against the die face to form the same. The heavy portion of the suction cup pressing on the tag to depress the spring biased platform completes the forming of the tag thereon before the platform strikes a stop. These bell crank levers operated by pivoted crank arms, actuated by the depression of the spring biased die platform, provide a novel feature of this invention.

Another object of this invention is the provision of the flexible reed positioned to striking a tag when actuated by a force such as an air blast to flex the reed and push the tag from the die platform to discharge. To insure the actual removal of the formed tag from the die platform the latter is provided with a cutout that permits the reed to extend a goodly portion of the tag width that causes the tag to be totally removed.

Another object of this invention is the provision of a carriage having spaced members, one member to pick up a new tag at the loading station and another member to pick up a marked or embossed tag at the marking station and with one movement of the carriage these members are automatically positioned, the new tag to the marking station and the marked tag to the forming and discharge station. These pick-up members with their suction cups accurately positioned the tag at each station. The extension of the suction cups in placing these tags at the second and third stations performs an accurate function, at the marking station the tag is placed on a ledge until clamped, at the forming and discharge station, the extension of these members, the movement of which actually does the forming of the tag.

Other objects and advantages appear hereinafter in the following description and claims.

The accompanying drawings show for the purpose of exemplification without limiting the invention or claims thereto, certain practical embodiments illustrating the principles of this invention wherein:

FIG. 3 is a view in vertical section at the tag marking station.

FIG. 4 is a sectional view of the tag end forming station and the discharge station.

FIGS. 7 to 15 inclusive are diagrammatic representations of the consecutive automatic steps of the tag feeding machine comprising one complete cycle of the machine of this invention.

FIG. 16 is a pneumatic and electrical circuit diagram illustrating the control and operation of this invention.

FIG. 17 is a time chart showing the sequence of the operation for the control in FIG. 16.

Figure 1:
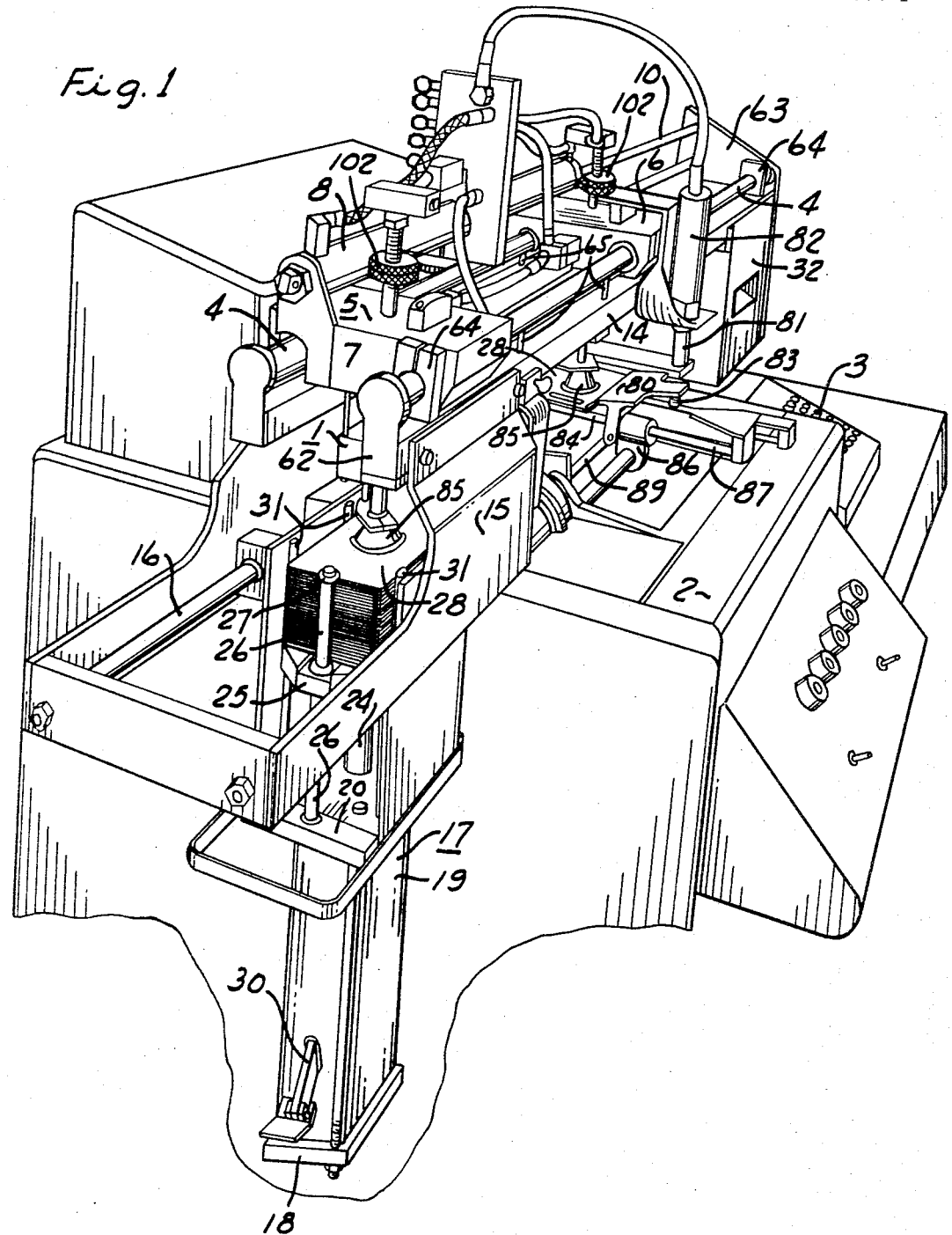
FIG. 1 is a perspective view showing this invention as applied to an electronically actuated tag marking machine.
Figure 2:
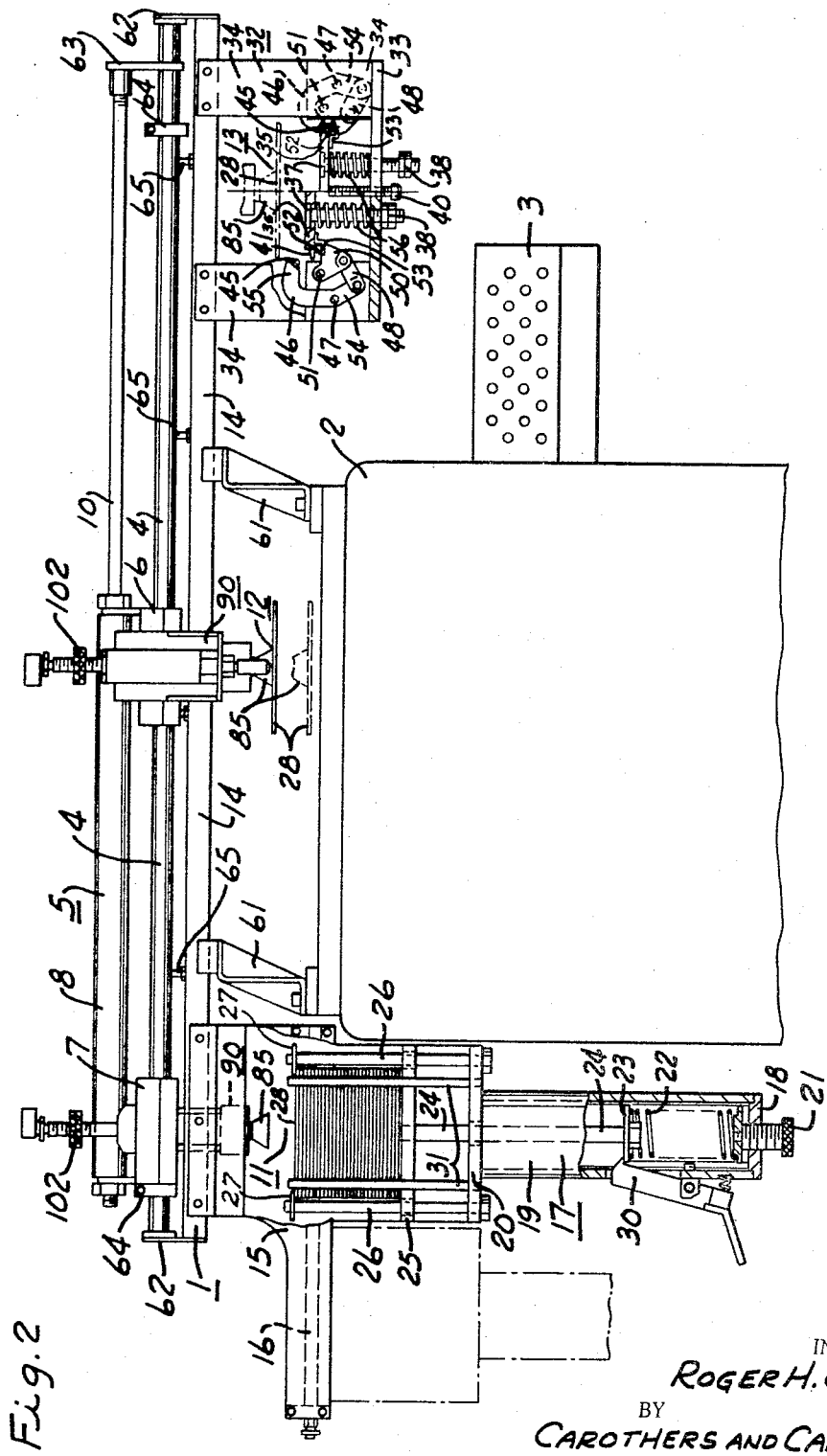
FIG. 2 is a front elevation of the tag feeding machine comprising this invention.

Referring to the drawings and principally FIGS. 1 and 2, the automatic tag feeding machine comprising this invention includes a base structure 1 mounted on the electrically actuated marking device 2 having a keyboard 3 and providing the guide means in the form of the parallel rod 4 that slidably support the carriage 5 which includes the spaced housing 6 and 7 connected by the cylinder 8. The piston rod 10 which is stationary and is secured to the base 1 for the purpose of shifting the carriage 5 back and forth between the three lineally positioned stations 11, 12 and 13, which in this configuration represent the pickup station 11, the working or marking station 12, and the tag end forming and discharge station 13.

The spaced channel members 14 are secured together by the housing 15 at the station 11 which housing carries the spaced rods 16 on which to slide the tag support member 17 from its loading position to the left, as shown in dotted lines in FIG. 2 to its feeding position as shown in full lines in FIG. 2. The tag feeder support 17 consists of a cylinder 19 closed at its opposite ends by the plates 18 and 20 which are bolted together and against the opposite ends of the cylinders to hold them in assembled relation. The lower plate 18 has a spring adjusting screw 21, the inner end which supports the lower end of the coil spring 22. A circular plate 23 on the bottom of the rod 24 is supported and may be secured to the upper end of this coil spring 22.

The rod 24 extends upwardly through the plate 20 and supports the movable platform 25 which is slidable on the spaced rods 26 that are provided with a lip or holding member in the form of the washer 27 at its upper end. A rod 26 is positioned on each end of the stack with a washer 27 positioned on each end of the stack of tags 28 and the uppermost tag on top of the stack is illustrated by the washers 27.

When it is desirable to refill the stack of tags 28, the handle on the plate 20 is grasped to pull the assembly to the left in FIGS. 1 and 2 which is slidable along the rods 16 removing the stack of tags 28 from their feeding position in station 11. At this time the stack of tags 28 or the movable platform 25 is depressed forcing the rod 24 downwardly and compressing the spring 22 until the latch 30 engages the top of the plate 23 to hold the spring 22 in its compressed position as shown in FIG. 2. In this position the platform 25 is near or resting on the plate 20 and the hold washers 27 remain at the top of the rods 26. This permits a new and full stack of tags 28 to be positioned in this charging device and under the holding washers 27 after which the latch 30 of the charging device is released by pressing the bottom of the lever thereby permitting the platform 25 to raise the stack of tags 28 upwardly until they are arrested in movement by the holding washers 27. The tag charging device is then moved back into position in the station 11 as shown in FIG. 1, and, in solid lines, in FIG. 2. Two pairs of rods 31 are placed on opposite sides of the stack of tags 28 which with the stationary rods 26 align the stack for proper dispensing at the station 11. When the tag charging device is moved to the inner end of the housing 15 the tags are properly positioned for dispensing.

The opposite end of the base is provided with the housing 32 which as shown in FIGS. 2 and 3 at the forming and discharge station 13. The housing 32 is provided with a plate member 33 and the side members 34 and in FIG. 2 wherein the forming device is shown partly in section as illustrated in two of its forming positions.

Figure 5:
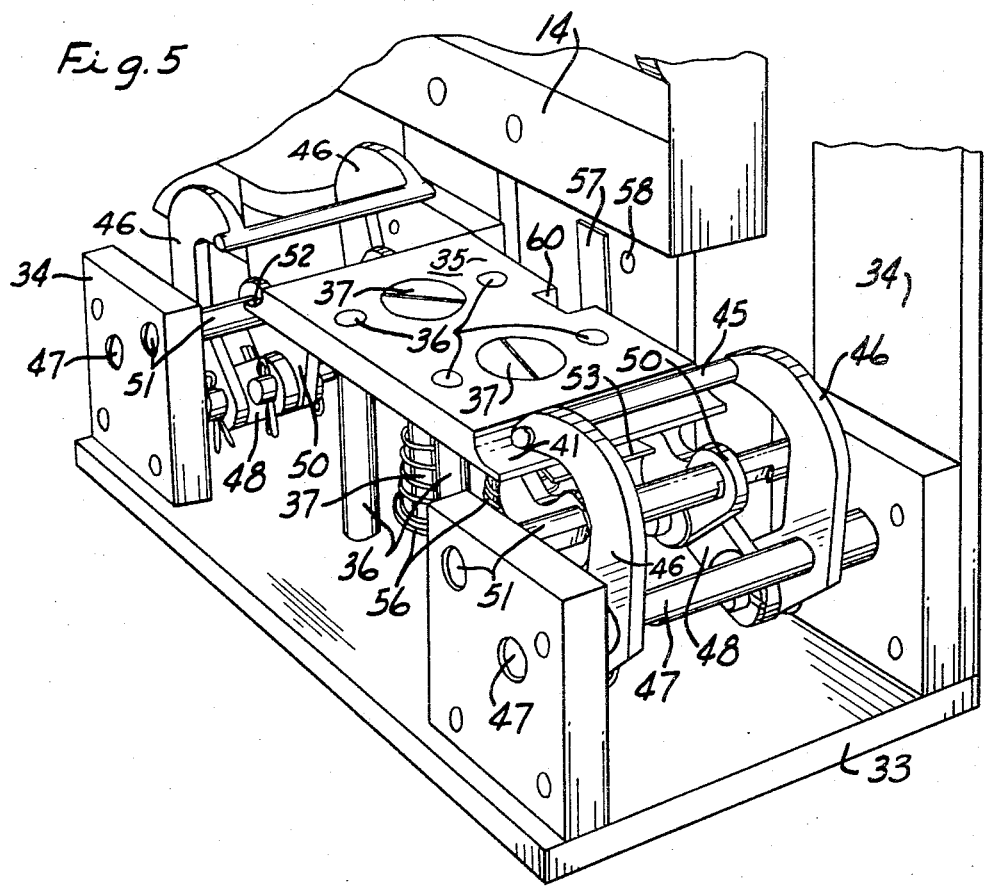
FIG. 5 is a perspective view of the tag end forming station and the discharge station.

This forming device comprises the forming platform 35 guided by four guide pins 36, more clearly shown in FIG. 5, and provide with two spring guides 37 that extend through the platform 35 and extend through the plate member 33 and threaded to receive the lock stop nuts 38 that determine the extent of the upward travel of the platform 35. The downward limited movement of the platform 35 is determined by the stop bolt 40 in the plate 33 which may be locked in position as shown in FIG. 2.

Figure 6:
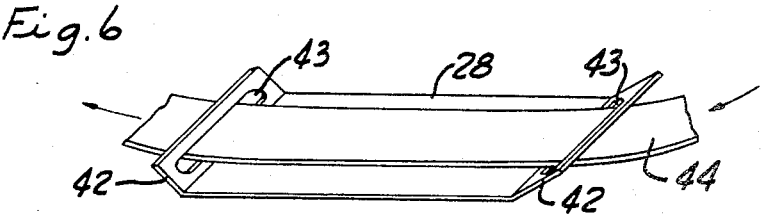
FIG. 6 is an end perspective view of a formed tag with a metal strap threaded therethrough.

At each end of the movable platform 35 a die surface 41 is formed, in this instance is for the purpose of bending the ends of the tag downwardly as illustrated at 42 in FIG. 6 so as to position the slots 43 on the back of the tag for threading therethrough the metal strap member 44. The metal strap member 44 passes through the slots 43 of this metal tag 28 thus, permitting the strap to be tightly contracted against the steel coil or the other article to be tagged in the mill so that the ends 42 of the tag will have a tendency to be straightened and thus increase the rigidity of the fastening to the article being tagged.

The ends 42 of the tags are shaped or formed in the die sections 41 by the transverse forming members 45 on the ends of the bell crank levers 46 pivotally supported on the pivot pins 47 that extends through and are mounted in the sides 34 of the housing. The other end of the bell crank levers 46 are connected by a pivoted link 48 to the operating crank 50, the pivotal members 51 of which are also secured in the sides 34 of the housing. The operating crank is provided with a transverse operating pin 52 which are retained by the brackets 53 secured to the underside of the platform 35 as shown in FIG. 2.

As shown in FIGS. 2 and 5 the bell crank levers 46 are formed are formed in pairs rather than a solid member and they are spaced by the transverse forming members 45 which are welded to join the pair and they are secured in spaced relation to the single pivot pin 47. Likewise, the operating cranks 50 are made in pairs and are connected by the transverse operating pins 52 that make them integral and they are also secured to their pivot pins 51 making them a unitary member.

The swing of the operating crank downwardly when a tag is positioned on the top of the movable platform 35 and forced downwardly causes the operating crank 50 to swing on the arc defined by the radius of the pivotal connection of the link 48 and the transverse operating pin 52 to move through the links 48 to the bell crank levers 46 with their short arms 54 traveling through a similar arc about the pivot pin 47 to multiply the arcuate distance traveled by the transverse forming member 45 through its arc 55, as shown in the two positions in FIG. 2, so that when the platform 35 engages the stop 40 the transverse forming member 45 has depressed and formed the ends of the tag 28 in the shape as illustrated at 42 in FIG. 6.

Upon the release or the raising of the member that deposited the tag 28 on the platform 35, the springs 56 on the vertical guide members 37 of the platform 35 cause the latter to raise to the uppermost position as illustrated on the left at the station 13 in FIG. 2.

At this time a flexible reed member 57 is engaged by a blast of air from a nozzle 58 causing it to move forward and into the notch 60 of the platform 35 to bat the formed tag 28 and thus discharge the same forwardly from the machine at station 13.

Thus, the base 1 with its base channel members 14 are secured together by means of the housing 15 at one end, station 11, and 32 at the opposite end at station 13. These channel members are also secured by the brackets 61 that are bolted to the top of the machine 2 on opposite sides of the intermediate work station which in this instance is the marking station 12 as shown in FIG. 2. The rods 4 being supported at their opposite ends by the brackets 62 from their respective channels 14 represent the sole support for the guide rods 4 on which the carriage 5 is slidable.

The spaced guide rods 4 are also secured relative to each other by the bracket member 63 as shown in FIGS. 2 and 4 on which the end of the piston rod 10 is secured so as to make the same stationary. The brackets 63 may be adjusted at different positions for properly locating the carriage 5 at each of the stations. At least one of the guides 4 is provided with a pair of adjustable stock members 64 for determining the exact position that the carriage 5 may be moved along the guides 4 for properly locating the housings 6 and 7 at the respective stations 11, 12, and 13.

Aside from the brackets 62 the parallel guide rods 4 are supported from the channel 14 by means of the post 65 as shown in FIG. 3 at station 12 wherein the housing 7 of the carriage 5 is positioned at the marking station 12. The marking device 2 is an electronically operated machine for marking or making impressions such as embossing on the tags 28 which includes a rotary marking disc 66 with the male impression 67 therein positioned immediately below the female impression 68 of the rotary disc 70. The female impressions 68 are spaced on independent fingers, the outer ends which bend upwardly in FIG. 3 and is forced downwardly by the impression member 71 to push the female member 68 against the inserted tag member 28 on to the male impression member 67 above the anvil 72. The character formed by the male and female member 67 and 68 in the tag 28 becomes imprinted or embossed in the tag.

The marking device 2 is provided with a rotary shaft 73 that operates the crank member 74 riding in the slot 75 of the follower 76 which causes the impression member 71 to move downwardly through its guide 77 and form the impression in the tag. The electronically marking device 2 will automatically position the tag 28 and print or otherwise form thereon in a plurality of lines any wording or indicia desired to be placed on the tags. This also includes the shifting laterally of the clamp member 80 which is actuated by the pneumatic piston rod 81 from a cylinder 82. This piston rod 81 is provided with a spring return and the clamp 80 has a clamping spring 83 to force its clamping edge onto the ledge or seat 84 on which the tag 28 has been positioned by the vacuum cup 85. The ledge 84 is part of the table 86 together with the slidable clamp 80 on the rod 87 that is supported on the carriage 88 slidable on the parallel transverse guides 89. The electronically actuated marking machine 2 not only controls the positioning of the rotary disc 66 and 70 but also positions the carriage 86 so as to locate the tag 28 in the gap between the discs 66 and 70 for properly printing or forming thereon a marking that may include 9 or more lines with printing or indicia for the full length of the tag or between the formed ends 42.

As illustrated in FIGS. 1 and 2 the station 12 places the carriage 86 so that the ledge 84 will receive the tag 28 centered. However, the tag itself will be at the extreme right of the operating position by the anvil 72 which will permit the tag to be printed from left to right as it progresses from the station 12 to the printing position indicated by the anvil 72. When the indicia has been complete on the tag the carriage 86 is again returned to that shown in FIG. 1 where the vacuum cup 86 raises the same to carry the marked tag from the station 12 to the station 13.

As further shown in FIGS. 2 and 3 the operating members 90 mounted in each of the housings 6 and 7 are identical in construction and include a cylinder 91 seated in the underside of its respective housing 6 or 7 having its upper end seated in its respective housing and its lower end seated in the block 92, the block 92 being secured to its respective housing by the diagonal rods 93. The interior of the cylinder 91 is provided with a piston 94 held between the sleeves 95 that are fixed on the piston rods 96 by the split locking ring 97 which functions as steps for the piston rod in the opposite ends in the chamber indicated at 98.

The cylinder 91 and the piston rod 96 in each of the members 90 are sealed by O rings as indicated in FIG. 3. The piston rod 96 is hollow and the lower end is provided with a guide clamp 99 to carry the rod 100 that travels through a hole in the block 92 other than that carrying the diagonal clamp rods 93 as shown in FIG. 3. The upper split ring 97 stops the upward movement of the piston rod 96 just prior to the guide clamp 99 striking the upward movement of the block 92.

The suction cup 85 is secured to the hollow piston rod 96 and open to its interior to permit a suction to be applied to the cup 85 for the purpose of picking up and holding the tags 28. The lower perimetral edge of the suction cup 85 is formed into a light feather edge so that it will follow impressions on the surface of the printed or embossed tag and hold the tag regardless of the jaring actions of the split ring stops 97 or the carriage stops 64.

At the marking station 12, a bracket 101 which is the same bracket that supports the pneumatically actuated clamp opening cylinder 82 employed to operate the spring loaded clamp 80. The upper portion of this bracket extends over the housing 6 and 7 depending upon which is positioned at the marking station 12, so as to engage the stop locking nuts 102 as indicated in dotted lines at the precise time the suction cups 85 position the tags 28 or are about to raise the tags 28 on the ledge 84 of the carriage 86. When the suction cup 85 is placing the tag on the ledge 84 the piston 81 retracts the spring loaded clamp 80 to draw it away from the path of the descending tag end at the time the latter rests on the ledge 84. The piston 81 then is retracted through the pneumatic cylinder 82 so that the spring loaded clamp 80 may be retracted to clamp the tag 28 and hold the same for printing. Thus, the stack 102 striking the bracket 101 is adjusted so that the tag 28 is just about to hit the surface of the ledge 84. When the pneumatic pressure is released from the cylinder 82 the spring biased piston 81 rises and the clamp 80 firmly grasps the tag on the ledge or seat 84. At this time the suction on the cup 85 is released and is drawn upwardly to the position shown in FIG. 3.

As illustrated in FIGS. 7 to 15 of the drawings, these diagrammatic showings illustrate the complete cycle or sequence of operation of the automatic tag feeding machine comprising this invention wherein, in FIG. 7 the operating member 90 from the housing 7 is at station 11 whereas the operating member 90 from the housing 6 is at 12 and fluid under pressure is about to be entered in the cylinders 91 at B1 to force the pistons 94 downwardly to the position shown in FIG. 8, wherein, the suction cups 85 are engaging with their respective tags 28 at stations 11 and 12.

As suction is applied to the suction cups 85 as shown in FIG. 9, at station 12 the spring biased piston 81 in the cylinder 82 is depressed to open clamp 80 and allow the suction in the suction cups 85 to hold their respective tag members 28 after which time the fluid under pressure is submitted to the ports B2 of the cylinders 91 to raise the piston 94 causing the tag 28 to arch under the pressure of the washers 27 which arching of the uppermost tag is insufficient to break the suction of the suction cup 85 but is sufficient to prevent more than one tag to be raised from a stack of tags at station 11. Further upward movement from the pistons 94 are shown in FIG. 10 and as illustrated, air is retained in the cylinder 82 to maintain its piston rod downwardly and thus maintain clamp 80 in retracted position. Air is entered into the port A2 of the carriage cylinder 8 for this upward movement. The carriage 5 and the housing members 6 and 7 are moved to the right into the position illustrated in FIG. 11 wherein the housing 7 supports its member 90 over the station 12 and the housing 6 supports its member 90 over the station 13.

The members 90 are each energized in their respective ports B1 to lower their piston 91 as illustrated in FIG. 12 to place the unmarked tag 28 on the shoulder ledge 84 under the clamp 80 and also move the marked tag 28 at station 13 downwardly depressing the platform 35 and causing the opposed tag shaped bell crank levers 46 to extend inwardly and downwardly on the ends of the tag so that the transverse forming member 45 and the corresponding die seat 41 of the platform 35 may shape the ends of the tags. At the same time the cylinder 82 is connected to tank to release the air and allow the piston 81 to raise to lower the clamp 80 on to the tag 28 in station 12 as shown in FIG. 13. The next position in FIG. 14 is the reversal of the ports to supply fluid under pressure to the ports B2 in the members 90 to raise the suction cups 85 which have in FIG. 13 been released of their suction pressure, and when the pistons 91 raise the suction cups 85, an air blast through nozzle 58 is sent against the flexible member 57 to knock the formed tag 28 off the platform 35 to discharge as illustrated in FIG. 14.

The port A1 of the cylinder 8 is then connected to exhaust and the port A2 is then connected to fluid under pressure to move the cylinder 8 and the carriage to the left to the position shown in FIG. 7 which completes the cycle. FIG. 16 is a circuit diagram of the fluid as well as the electrical circuits that achieve the progressive operative positions that are depicted in FIG. 7 to 15 in completing the cycle of the operation of this tag feeding machine. FIG. 17 discloses the timing chart illustrating a complete cycle of operation of the machine through the circuit diagram of FIG. 16. In considering both of these facts a timer 106 is provided with 5 or more contacts for operation of the solenoids. The several valves for controlling this machine as shown in the timing diagram FIG. 17, the first action or operation is the lowering of the members 90 as illustrated in FIG. 7. This is accomplished through the operation of the solenoid actuated valve 107 which is energized through the contact 108 of the timer 106 and which shifts the valve from its normal position as shown to supply air under pressure from the line 110 to the line 111 that supplies air under pressure to the ports B1 of the cylinders 90 by flowing with little resistance through the check valves 112 as well as the orifice 113 to the upper side of the pistons 94. Air under pressure on the top side of these pistons move their piston rods 96 downwardly as illustrated in FIG. 8.

As shown in the time chart FIG. 17, the movement of the piston 91 downwardly from FIG. 7 to FIG. 8 transpires at 0 in the abscissa of FIG. 17. This lasts for approximately one second and during this time the switch 114 in the timer 106 is actuated by its respective cam to energize the solenoid or valve 115 to operate this single acting valve and supply air under pressure to the line 116 where it passes through the venturi block 117 which are mounted on the tops of the piston rods 96. These venturi blocks exhaust the air from their respective venturies to produce a suction in the hollow piston rods 96 and which is affected on the vacuum cups 85 permit the same to pick up the tags as illustrated in FIGS. 8 and 9. In FIG. 17 the second graph indicated as vacuum was that this vacuum comes on in FIG. 8. The vacuum cup 85 at the station 11 picks up the tag 28 from the top of the stack whereas the vacuum cup supported from the housing 6 picks up the printed tag at station 12.

The next sequence immediately follows the previous one by a fraction of a second and this is actuated by the switch 118 in the timer 106 to shift the valve 119 that supplies air under pressure to the blank end of the cylinder 82 forcing the piston downwardly to release the clamp 81 as illustrated in FIG. 1. Immediately thereafter the clamp 80 is open as depicted in FIG. 9 and FIG. 9 is indicated in this position on the clamp curve as shown in FIG. 17.

Immediately following this step the switch 108 is actuated by its cam to open the same and since each of the valves are spring returned on de-energization of the solenoid valve 107 it returns to the position shown in FIG. 16 for air under pressure is supplied to the line 120 which allows the air to travel through its respective check valve 112 in parallel with their orifice 113 to supply air through the ports B2 below pistons 94 and thus move them vertically upwardly in the cylinders 91. This is depicted in FIG. 17 and FIG. 10 being associated with the first curve relating to the operation of the members 90 by operation of the structure as shown in FIG. 10 at the 1 second interval. The upward movement of the pistons 94 are retarded somewhat by the discharge of air through the orifices 113 and the line 111 to discharge. However, air under pressure is retained in the bottom of these cylinders during the operation of the machine through the part cycle until the members 90 are again lowered.

The next or fifth step is the traverse of the carriage 5 by means of the actuation of the cylinder 8. This is performed by the respective cam and the timer 106 to actuate and close the switch 121 which energizes the solenoid of the spring return valve 122 which supplies air through the line 123 to the port A2 cylinder 8 through the check valve 112 in parallel with the orifice 113. This is depicted in FIG. 17 by the addition by the air notation of FIG. 10 to FIG. 11 between one and two seconds of the chart. This will supply air on the right side of the piston on the piston rod 10 which will draw the cylinder 8 to the right and traverse the carriage 5 from the position shown in 10 to the position shown in 11. In doing this the air on the opposite side of the piston in cylinder 8 is discharged through the orifice 113 to exhaust which provides a retarding control of this movement of the carriage.

After the carriage 5 has shifted to the right as shown in FIG. 11 the cylinders 90 are energized to again lower their respective vacuum cups 85 with a tag on each one which is depicted in FIG. 12. The notation of FIG. 12 is placed on the curve depicting the operation of the members in FIG. 17. As soon as the tag 28 has been deposited on the shoulder 84 the cylinder 82 is deenergized by the cam opening the switch 118 which allows the spring actuated valve 119 to open and allow the retained pressure above the spring actuated piston in cylinder 82 to escape. This is depicted in the clamp curve 17 by the notation of FIG. 13 adjacent this curve and as clearly shown in FIG. 13 by the release of the clamp 80. At the same time the vacuum cup 85 from the cylinder 90 secured to the housing 6 presses its marked tag 28 against the platform 35 causing the bell crank members 46 to move inwardly and shape the ends of the tag as previously described. When this has been completed, the vacuum is released from the vacuum cups 85 by the switch 114 being open by its cam to de-energize the solenoid operating the valve 115 and cutting off the air to the venturi blocks 117 to destroy the vacuum therein. This is depicted in FIG. 17 by the notation of FIG. 14 adjacent the vacuum curve immediately following the closing of the clamp 80.

At substantially the same time the members 85 are again raised by the cam actuating the switch 108 to release the solenoid of the spring return valve 107 for again supplying pressure below the respective resistance 94 of the members 90 to raise the same which action is started as shown in FIG. 14. FIG. 14 is thus placed adjacent the curve depicting the operation of the members as illustrated on the graph of FIG. 17.

The fifth graph shown in FIG. 17 depicts the operation of the cam in closing the switch 124 to energize the solenoid of the spring return valve 125 which supplies air to the nozzle 58 that is directed against the flexible member 57 to knock the piece 28 from the platform 35 as indicated in FIG. 14 thus the fifth curve in the chart of FIG. 17 shows the blast of air lasting substantially a quarter of a second to knock the flexible member 57 and eject the formed and printed tag 28 from the machine.

Within the next second the switch 121 is actuated by its cam in the timer 106 to de-energize the solenoid of valve 122 and thus admit air to the port A1 of the cylinder 8 and return the carriage 5 from the position shown in FIG. 14 to the position shown in FIG. 15 which completes the cycle insofar as the operation of the carriage is concerned. A new tag has been positioned at the printing station 12 and the printed tag at station 13 has been ejected from the machine. Although the tag feeding mechanism has completed its cycle the tag in the printing position held by the clamp 80 is inserted in the printing or embossing machine 2 and after the indicia has been completed, the timer is then reset to start the feeding cycle of this machine. These two steps are depicted in FIG. 17 in the sixth and seventh curves, the sixth showing that the initiation of the printing machine 2 and after a suitable period of time between the pulse actuations of starting the printing mechanisms to the time the tag has been completed in the marking thereof, the timer then takes over automatically the cycle as previously described.

I claim:

1. A tag feeding machine having a two position shiftable carriage supporting a pair of vertically movable fluid actuated vacuum cup means to progressively transfer the tags in stages through a plurality of stations for tag pick up, tag clamping against an aligning ledge for marking, tag shaping and thereafter tag discharging characterized by tag holding means for engaging positions on opposite edges of the top tag on a stack of flexible tags, biasing means to urge the top tag of the stack against said holding means, the suction of said vacuum cup means lifting the center of the uppermost tag of the stack to flex and withdraw a single tag from under the holding means for transfer to the tag marking station.

2. The tag feeding machine of claim 1 characterized by latch means to retain said biasing means while loading tags under said tag holding means.

3. The tag feeding machine of claim 1 characterized by a platform carrying die surfaces and having limited vertical movement, biased upward pressure means on said die carrying platform, and tap shaping means actuated by said vacuum cup means exerting downward movement of said platform opposing said biased upward pressure means when said vacuum cup means pushes the tag and platform down upon depositing a tag thereon to shape the same.

4. The tag feeding machine of claim 3 characterized by a former as part of said tag shaping means pivoted on a fixed structure of the machine to swing and co-operate with said die surface on said platform in shaping the tag upon the downward movement of said platform by the vacuum cup pushing the tag downwardly thereon.

5. Automatic tag feeding machine for marking tags and serving a lineally arranged series of three equally spaced stations including a tag loading station, a tag marking station and a tag shaping and discharge station, a base having a guide, a carriage slidable between two positions on said guide and having a spaced pair of members to concurrently pick up tags from the first and second stations and lay them down at the second and third stations respectively, means to shift said carriage from its first position to its second position and return, means at said first station holding the opposite ends of the top tag in a stack to arch the same when picked up by said first member, a clamp means at said second station to receive a tag from said first member and hold the tag when working and until pick up by said second member, shaping means at said third station actuated by said second member in depositing each tag thereon to shape the same before being disengaged from said second member, and a flexible means at said third station to eject the formed tag at said third station after said second member is disengaged from the shaped tag, said shaping means includes a plate with sides and supporting an upwardly extending spring biased die engaged by the tag being lowered by said second member, a die operating crank pivoted on said sides on opposite sides of said die and swung by the downward movement of said die, a tag shaping bell crank pivoted on said sides on each side of said die, a link connecting each respective opening at crank to bell crank to engage the latter and shape the opposite ends of the tag in the die as said second member moves the tag and die downwardly.

6. An automatic tag feeding machine for marking tags and serving a lineally arranged series of three equally spaced stations including a tag loading station, a tag marking station and a station for the shaping and discharge of the tag and including a base having a guide for a carriage shiftable between two positions on said guide and having a spaced pair of pickup members to concurrently pick up tags from the first and second stations and lay them down at the second and third stations respectively and return to complete the cycle, characterized by retaining means at said first station to arch the top tag being lifted to prevent raising more than one tag at a time, clamp means at said second station to receive and holds the tag from said first pickup member and when marking the same and until pickup by said second pickup member, shaping platform at said third station actuated by the deposit of each tag thereon to bend the opposite tag ends, and a flexible actuated means at said third station to eject the bent tag after said second member is disengaged therefrom.

7. The tag feeder of claim 6 wherein said flexible means at said third station is a reed normally extending vertically and out of the path of the tag, and a controlled airjet to strike and flex said reed into engagement with the tag to eject it from said platform at said third station.

8. The automatic tag feeding machine of claim 6 characterized by timer means connected to concurrently actuate said pickup members to sequentially pick up tags then transverse said carriage, then lower said tags at the next work station and thereafter said tags are discharged at the last station and the carriage is returned to complete the cycle.

9. The automatic tag feeding machine of claim 6 characterized by independent fluid actuated means to operate each of said members and said carriage, a solenoid valve to simultaneously control the movement of said members, a second solenoid valve to control the movement of said carriage to position said members and the tags at respective time for working, timer means connected to return said carriage to selected stations and concurrently proceed to lower said members, pick up tags at the selected stations, move said carriage to the next selected stations, lower said members to deposit the same.

(References on following page)

References Cited

UNITED STATES PATENTS

| | | | |
|---|---|---|---|
| 1,534,890 | 4/1925 | Baumann | 72—418 X |
| 2,377,097 | 5/1945 | Norris | 72—405 X |
| 2,694,994 | 11/1954 | Weymouth et al. | 72—427 X |
| 3,039,623 | 6/1962 | Sehn et al. | 214—1 |
| 3,202,026 | 8/1965 | Buhl | 83—76 X |
| 3,225,891 | 12/1965 | Hicken et al. | 214—1 |
| 3,281,140 | 10/1966 | Smierciak | 269—32 X |

CHARLES W. LANHAM, *Primary Examiner.*

E. SUTTON, *Assistant Examiner.*